(12) United States Patent
Ohba

(10) Patent No.: US 10,704,898 B2
(45) Date of Patent: Jul. 7, 2020

(54) SHAPE MEASURING APPARATUS AND METHOD FOR MANUFACTURING TARGET OBJECT TO BE COATED

(71) Applicant: NTN CORPORATION, Osaka-Shi, Osaka (JP)

(72) Inventor: Hiroaki Ohba, Shizuoka (JP)

(73) Assignee: NTN CORPORATION, Osaka (JP)

( * ) Notice: Subject to any disclaimer, the term of this patent is extended or adjusted under 35 U.S.C. 154(b) by 23 days.

(21) Appl. No.: 16/076,311

(22) PCT Filed: Jan. 10, 2017

(86) PCT No.: PCT/JP2017/000463
§ 371 (c)(1),
(2) Date: Aug. 7, 2018

(87) PCT Pub. No.: WO2017/138281
PCT Pub. Date: Aug. 17, 2017

(65) Prior Publication Data
US 2019/0049236 A1    Feb. 14, 2019

(30) Foreign Application Priority Data
Feb. 8, 2016    (JP) .................................. 2016-021831

(51) Int. Cl.
*G01B 11/24*    (2006.01)
*G06T 7/571*    (2017.01)
(Continued)

(52) U.S. Cl.
CPC ........ *G01B 11/2441* (2013.01); *G01B 9/0203* (2013.01); *G01B 9/0209* (2013.01);
(Continued)

(58) Field of Classification Search
CPC ................ G01B 9/0203; G01B 9/0209; G01B 11/2441; G02B 7/38; G06T 7/571; G06T 7/73
See application file for complete search history.

(56) References Cited

U.S. PATENT DOCUMENTS

| 5,784,164 A * | 7/1998 | Deck ........................ G01B 9/04 250/201.3 |
| 2006/0018514 A1 | 1/2006 | Bankhead |

(Continued)

FOREIGN PATENT DOCUMENTS

| GB | 2395777 A | 6/2004 |
| JP | 2013-036848 A | 2/2013 |

(Continued)

OTHER PUBLICATIONS

Soek-Moon Ryoo et al., "A New Approach to 3-D Profilometry for the White Light Interferometric (WLI)," IEICE Transactions on Fundamentals of Electronics, Communications and Computer Sciences, Engineering Sciences Society, Tokyo, Japan, vol. E84-A, No. 1, Jan. 1, 2001, pp. 378-382.
Extended European Search Report issued in corresponding European Patent Application No. 17750006.3, dated Aug. 28, 2019.

(Continued)

*Primary Examiner* — Michael A Lyons
(74) *Attorney, Agent, or Firm* — McDermott Will & Emery LLP

(57) ABSTRACT

A shape measuring apparatus includes: a light source; a two-beam interference objective lens; an imaging device; an observation optical system; a positioning device; and a control device. The control device calculates, for each unit region in the plurality of images obtained by the imaging device, as a focus position of the unit region, a position of the two-beam interference objective lens at which a luminance-based evaluation value is maximized over the plurality of images, and the control device measures a shape of a target object based on the focus position of each unit region in the plurality of images. The control device uses, as the (Continued)

evaluation value, a luminance of each unit region in the plurality of images as well as a value correlated with a difference between the luminance of the unit region and luminances of a plurality of unit regions adjacent to the unit region.

5 Claims, 13 Drawing Sheets

(51) Int. Cl.
      *G01B 9/02*       (2006.01)
      *G02B 7/38*       (2006.01)
      *G06T 7/73*       (2017.01)
      *G02B 27/12*       (2006.01)
      *G01B 11/02*       (2006.01)
      *G06T 7/13*       (2017.01)

(52) U.S. Cl.
    CPC .............. *G02B 7/38* (2013.01); *G02B 27/123* (2013.01); *G06T 7/571* (2017.01); *G06T 7/73* (2017.01); *G01B 11/026* (2013.01); *G06T 7/13* (2017.01); *G06T 2207/30148* (2013.01)

(56) References Cited

U.S. PATENT DOCUMENTS

| | | | |
|---|---|---|---|
| 2008/0123103 A1* | 5/2008 | Fujii | G01B 11/2441 356/496 |
| 2009/0010560 A1* | 1/2009 | Chen | G01B 11/2441 382/255 |
| 2013/0242311 A1* | 9/2013 | Usami | G01B 9/02007 356/492 |
| 2014/0168660 A1 | 6/2014 | Yan et al. | |
| 2018/0252512 A1* | 9/2018 | Ohba | B05C 5/02 |

FOREIGN PATENT DOCUMENTS

| | | |
|---|---|---|
| JP | 2015-007564 A | 1/2015 |
| WO | 2014/208362 A1 | 12/2014 |

OTHER PUBLICATIONS

International Search Report issued in corresponding International Patent Application No. PCT/JP2017/000463, dated Mar. 21, 2017, with English Translation.

Chinese First Office Action issued in corresponding Chinese Application No. 201780010383.2, dated Dec. 16, 2019, with English translation.

\* cited by examiner

SHAPE MEASURING APPARATUS AND METHOD FOR MANUFACTURING TARGET OBJECT TO BE COATED

CROSS REFERENCE

This application is the U.S. National Phase under 35 U.S.C. § 371 of International Application No. PCT/JP2017/000463, filed on. Jan. 10, 2017, which claims the benefit of Japanese Application No. 2016-021831, filed on Feb. 8, 2016, the entire contents of each are hereby incorporated by reference.

TECHNICAL FIELD

The present invention relates to a shape measuring apparatus and a method for manufacturing a target object to be coated using the shape measuring apparatus. More particularly, the present invention relates to a shape measuring apparatus for measuring a surface shape of a metal, a resin and a processed product thereof or a shape measuring apparatus for measuring a surface shape of a semiconductor substrate, a printed substrate and a substrate of a flat panel display and the like, and a method for manufacturing a target object to be coated using the shape measuring apparatus.

BACKGROUND ART

Japanese Patent Laying-Open No. 2015-7564 (PTD 1) discloses a coating apparatus configured to position a two-beam interference objective lens above an ink-coated portion formed of ink applied on a surface of a substrate; thereafter obtaining an image of interference light while moving a Z stage; obtaining, as a focus position of each of a plurality of pixels forming the image, the position of the Z stage where the contrast value reaches a peak for each of the plurality of pixels forming the image; and obtaining the height of the ink-coated portion.

CITATION LIST

Patent Document

PTD 1: Japanese Patent Laying-Open No. 2015-7564

SUMMARY OF INVENTION

Technical Problem

A two-beam interference objective lens causes interference between reflected light from a surface of a target object and reference light to obtain interference light. For example, when the target object has a flat surface and the target object is disposed perpendicularly to an optical axis of the objective lens, the reflected light is regular reflected light and the contrast of the interference light is high. However, in a state where the target object is inclined, the reflected light returning to an aperture of the objective lens decreases and the intensity of the reflected light decreases. As a result, the contrast of the interference light also decreases.

The decrease in contrast of the interference light makes a clear contrast peak less likely to occur and makes detection of the peak difficult when a distance between the target object and the objective lens is changed. The height of a place where the peak cannot be detected is indefinite, and thus, it is difficult to accurately measure a shape of the target object.

A main object of the present invention is to provide a shape measuring apparatus capable of accurately measuring a shape of a target object.

Solution to Problem

A shape measuring apparatus according to the present invention measures a shape of a target object by applying white light to the target object and using reflected light from the target object. The shape measuring apparatus includes: a light source; a two-beam interference objective lens; an imaging device; an observation optical system: a positioning device, and a control device. The light source is configured to output the white light. The two-beam interference objective lens is configured to divide the white light output from the light source into two light beams, apply one of the two light beams to the target object and the other light beam to a reference surface, and cause interference between the reflected light from the target object and reflected light from the reference surface to output interference light. The imaging device is configured to obtain an image of the interference light output from the two-beam interference objective lens. The observation optical system is configured to guide the white light output from the light source to a surface of the target object through the two-beam interference objective lens and guide the reflected light from the surface to the imaging device through the two-beam interference objective lens. The positioning device is configured to move the two-beam interference objective lens relative to the target object. The control device is configured to obtain a plurality of images while changing a distance between the target object and the two-beam interference objective lens in an optical axis direction of the two-beam interference objective lens, and measure the shape of the target object using the plurality of images. The control device is configured to, for each unit region in the plurality of images, calculate, as a focus position of the unit region, a position of the two-beam interference objective lens at which a luminance-based evaluation value is maximized over the plurality of images, and measure the shape of the target object based on the focus position of each unit region in the plurality of images. The control device is configured to use, as the evaluation value, a luminance of each unit region in the plurality of images as well as a value correlated with a difference between the luminance of the unit region and luminances of a plurality of unit regions adjacent to the unit region.

Advantageous Effects of Invention

According to the shape measuring apparatus of the present invention, in addition to the luminance of each unit region in the plurality of images, the value correlated with the difference between the luminance of the unit region and the luminances of the plurality of unit regions adjacent to the unit region is used as the evaluation value, and thus, the focus position of each unit region can be calculated with a high degree of precision. As a result, the shape of the target object can be accurately measured.

DESCRIPTION OF EMBODIMENTS

[Configuration of Shape Measuring Apparatus]

Figure 1:
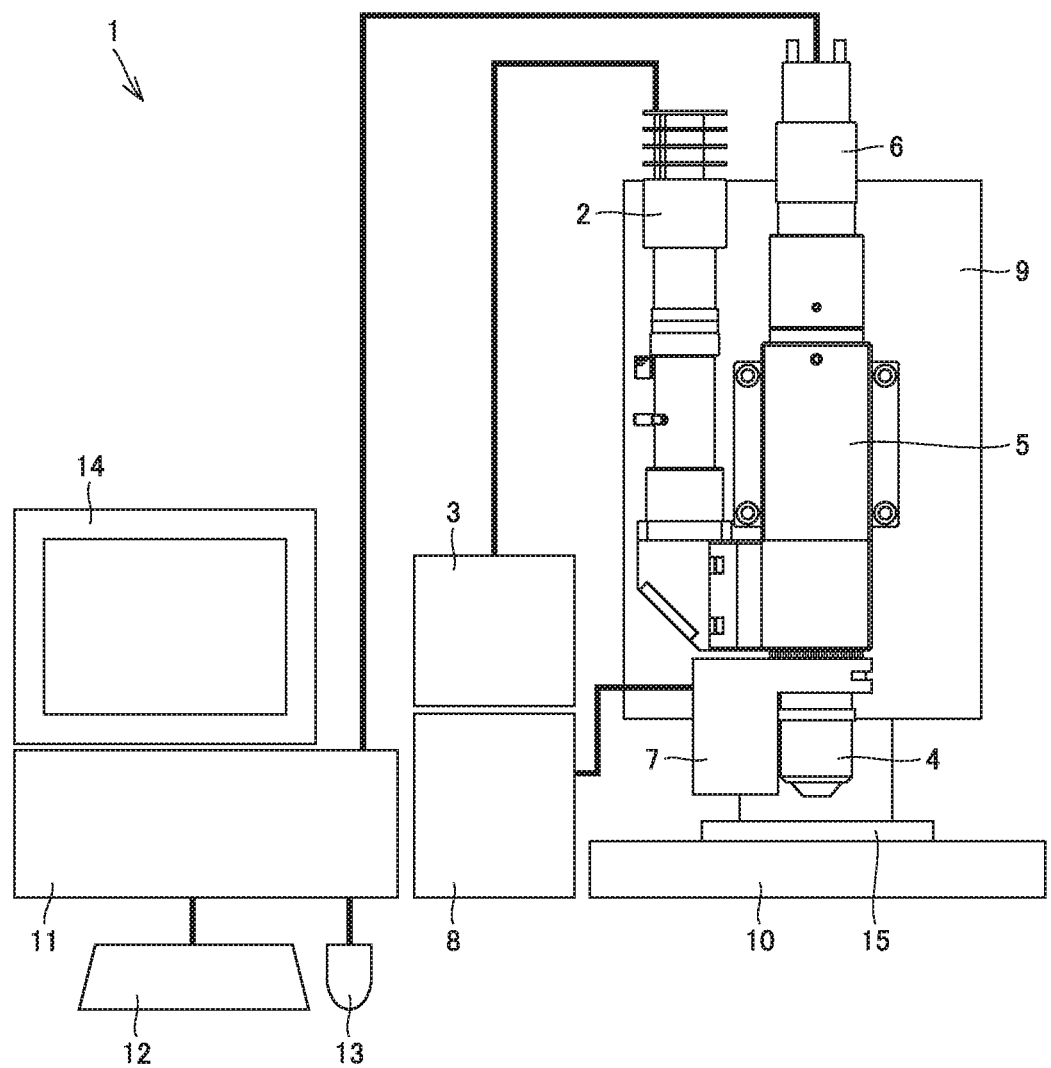
FIG. 1 is a diagram illustrating a configuration of a shape measuring apparatus according to an embodiment of the present invention.

FIG. 1 is a diagram illustrating a configuration of a shape measuring apparatus 1 according to an embodiment of the present invention. In FIG. 1, this shape measuring apparatus 1 includes a light source 2, a light source controller 3, a two-beam interference objective lens 4, an observation optical system 5, an imaging device 6, a Z stage 7, a Z stage controller 8, a support member 9, a base plate 10, a control device 11, a keyboard 12, a mouse 13, and a monitor 14. Observation optical system 5 is attached to base plate 10 with support member 9 interposed. A flat plate-shaped work 15 is placed on a surface of base plate 10. Shape measuring apparatus 1 measures a shape of the surface of work 15.

Light source 2 is provided on a side surface of observation optical system 5 to emit white light. Light source controller 3 is connected to light source 2 to control the brightness of white light in accordance with a command from control device 11. Light source controller 3 can control the brightness of white light, for example, by controlling power supplied to light source 2. White light emitted from light source 2 enters two-beam interference objective lens 4 through observation optical system 5. When light applied to work 15 is white light, a luminance of an image of interference light obtained by imaging device 6 is generally maximized at a focus position of two-beam interference objective lens 4, unlike single-wavelength light such as laser. Therefore, the white light is suitable for measuring the shape of work 15 based on the focus position.

Two-beam interference objective lens 4 is provided at a lower end of observation optical system 5 with Z stage 7 interposed. Two-beam interference objective lens 4 divides white light from light source 2 into two light beams. Two-beam interference objective lens 4 applies one of the light beams to the surface of work 15 and the other light beam to a reference surface. Two-beam interference objective lens 4 causes interference between reflected light from the surface of work 15 and reflected light from the reference surface to generate interference light. In the embodiment, the case of using a Mirau-type interference objective lens as two-beam interference objective lens 4 is described. A Michelson-type or a Linnik-type interference objective lens may be used as two-beam interference objective lens 4.

Observation optical system 5 is provided to observe interference light generated by two-beam interference objective lens 4.

Imaging device 6 is controlled by control device 11 to obtain an image of interference light through observation optical system 5 in a constant cycle Imaging device 6 outputs the obtained image to control device 11.

Z stage 7 is provided at a lower end of observation optical system 5 to move two-beam interference objective lens 4 in an optical axis direction thereof.

Z stage controller 8 moves Z stage 7 in the optical axis direction of two-beam interference objective lens 4 in accordance with a command from control device 11.

Instead of moving two-beam interference objective lens 4 with Z stage 7, work 15 may be moved up and down on a table. Alternatively, a table or the like may be attached to a joint portion of two-beam interference objective lens 4 and observation optical system 5 to adjust a position in the optical axis direction of two-beam interference objective lens 4. Alternatively, a piezo table that performs positioning using a piezoelectric element may be used as these tables.

Control device 11 is configured, for example, with a personal computer. Control device 11 is connected to keyboard 12, mouse 13, and monitor 14. The user of shape measuring apparatus 1 uses keyboard 12 and mouse 13 to give a command to control device 11, for example, for starting and stopping shape measurement, and checks the measured shape of work 15 with monitor 14. Control device 11 controls the entire shape measuring apparatus 1 in accordance with a signal from keyboard 12, mouse 13, and the like to measure the shape of work 15.

[Configuration of Control Device]

Figure 2:
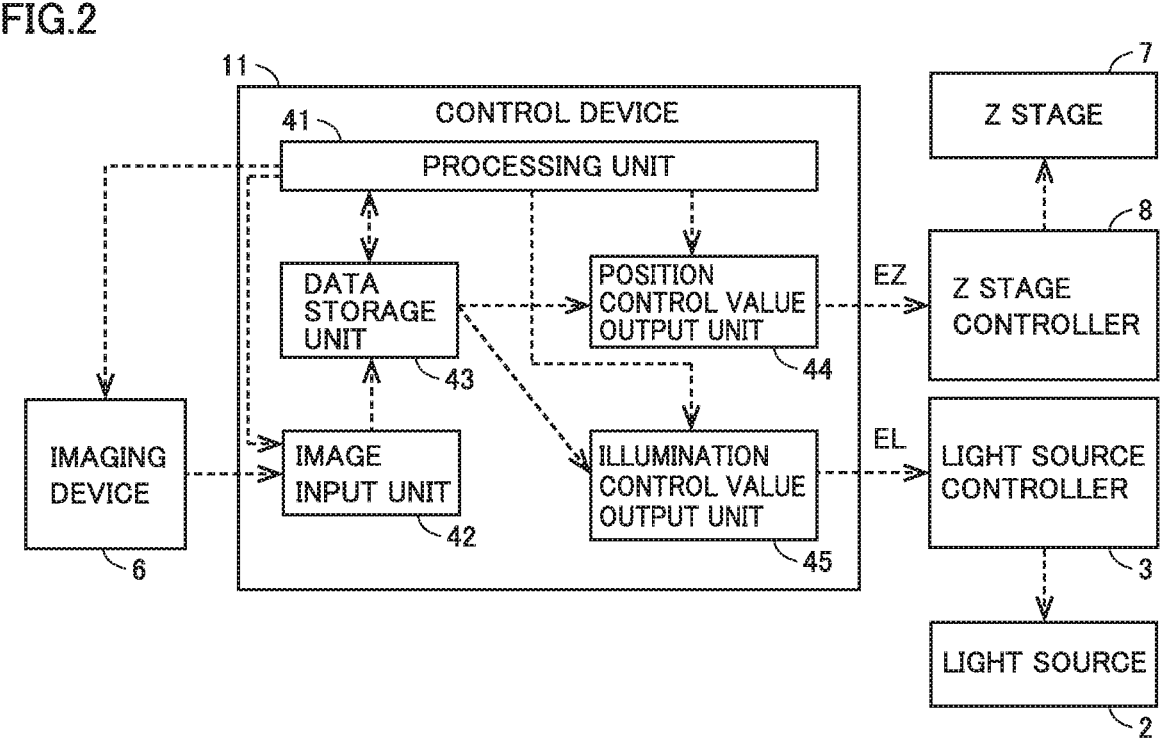
FIG. 2 is a functional block diagram for describing the function of a control device illustrated in FIG. 1.

FIG. 2 is a functional block diagram for describing the function of control device 11 illustrated in FIG. 1. As illustrated in FIG. 2, control device 11 includes a processing unit 41, an image input unit 42, a data storage unit 43, a position control value output unit 44, and an illumination control value output unit 45.

Processing unit 41 generates a position command value array that stores a value corresponding to a voltage value in accordance with the height of Z stage 7 and an illumination command value array that stores a value corresponding to the brightness of light source 2 in accordance with the height of Z stage 7, based on information provided using keyboard 12, mouse 13, and the like. The position command value array is used to control the position of Z stage 7 (height from work 15). The illumination command value array is used to control the brightness of light source 2 in accordance with the position of Z stage 7. Processing unit 41 writes the position command value array and the illumination command value array into data storage unit 43. In the embodiment, the value of the illumination command value array is constant in order to maintain the brightness of light source 2 almost constant.

Position control value output unit 44 reads the position command value array from data storage unit 43. Position control value output unit 44 outputs a control voltage EZ in accordance with the position command value array.

Z stage controller 8 moves Z stage 7 to a position corresponding to control voltage EZ output from position control value output unit 44.

Illumination control value output unit 45 reads the illumination command value array from data storage unit 43. Illumination control value output unit 45 outputs a control voltage EL in accordance with the illumination command value array. In the embodiment, the illumination command value array is almost constant, and thus, control voltage EL is almost constant.

Light source controller 3 can change the brightness of light source 2 in accordance with control voltage EL output from illumination control value output unit 45.

Image input unit 42 operates in synchronization with reading of the position command value array from data storage unit 43 by position control value output unit 44. Image input unit 42 obtains an image captured by imaging device 6 in a constant cycle. Image input unit 42 stores the obtained image in data storage unit 43.

[Principle of Focus Position Detection]

Figure 3:
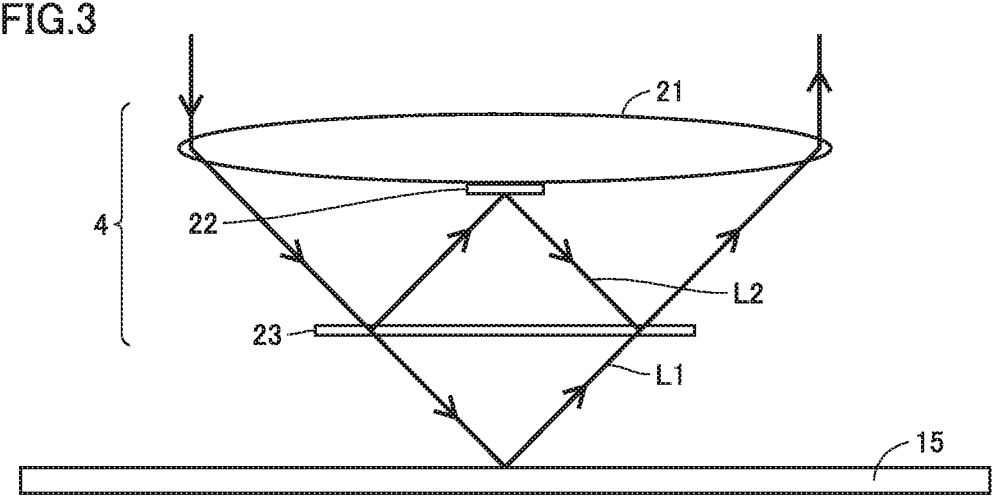
FIG. 3 is a diagram illustrating a configuration of a two-beam interference objective lens illustrated in FIG. 1.

FIG. 3 is a diagram illustrating a configuration of two-beam interference objective lens 4 illustrated in FIG. 1. As illustrated in FIG. 3, two-beam interference objective lens 4 includes a lens 21, a reference mirror 22 and a beam splitter 23. Reference mirror 22 is provided at the center of lens 21 on the side facing work 15. Beam splitter 23 is provided between lens 21 and work 15.

Light incident on lens 21 is split by beam splitter 23 into two beams of light, namely, light passing through in the direction of work 15 and light reflected in the direction of reference mirror 22. Light L1 reflected by the surface of work 15 and light L2 reflected by the surface of reference mirror 22 are merged again at beam splitter 23 and collected by lens 21.

Figure 4:
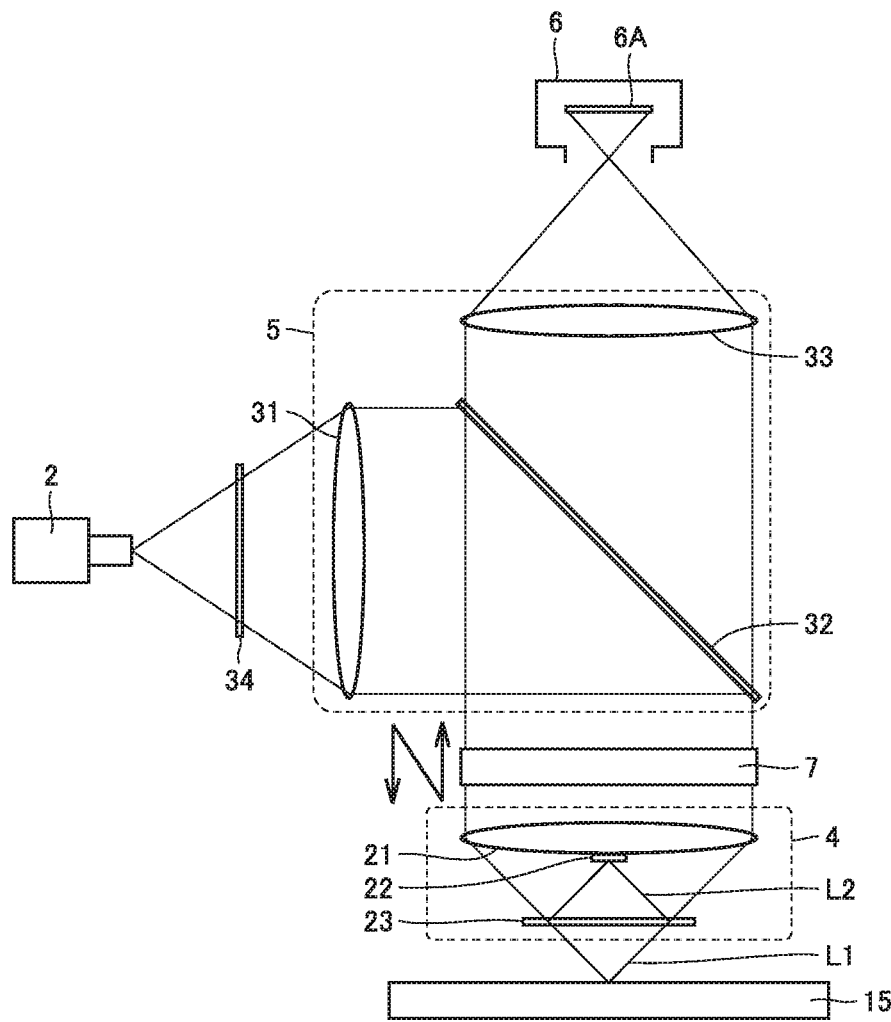
FIG. 4 is a diagram illustrating a configuration of an observation optical system illustrated in FIG. 1.

FIG. 4 is a diagram illustrating a configuration of observation optical system 5 illustrated in FIG. 1. As illustrated in FIG. 4, observation optical system 5 includes a condenser lens 31, a half mirror 32, and an image lens 33. The optical axis of two-beam interference objective lens 4 substantially coincides with the optical axis of image lens 33, and both axes pass through the center of an imaging plane 6A of imaging device 6. The optical axis of light source 2 substantially coincides with the optical axis of condenser lens 31, and both axes are substantially orthogonal to the optical axis of two-beam interference objective lens 4. A filter 34 is provided between light source 2 and condenser lens 31 for removing light of unnecessary wavelengths. Half mirror 32 is provided at the intersection of the optical axis of light source 2 and the optical axis of two-beam interference objective lens 4. Half mirror 32 is disposed at an angle of almost 45 degrees with respect to each of the optical axis of light source 2 and the optical axis of two-beam interference objective lens 4.

Light emitted from light source 2 and passing through filter 34 is reflected by half mirror 32 in the direction of lens 21. Light incident on lens 21 is split by beam splitter 23 into two beams of light, namely, light passing through in the direction of work 15 and light reflected in the direction of reference mirror 22. The beams of light reflected by the surfaces of work 15 and reference mirror 22 are merged again at beam splitter 23 and collected by lens 21. Light exiting from lens 21 passes through half mirror 32 and enters imaging plane 6A of imaging device 6 through image lens 33.

On imaging plane 6A, an image of interference light of light L1 reflected by the surface of work 15 and light L2 reflected by the surface of reference mirror 22 is obtained. The intensity of interference light changes with the difference between the optical path length of light L1 and the optical path length of light L2.

Figure 5:
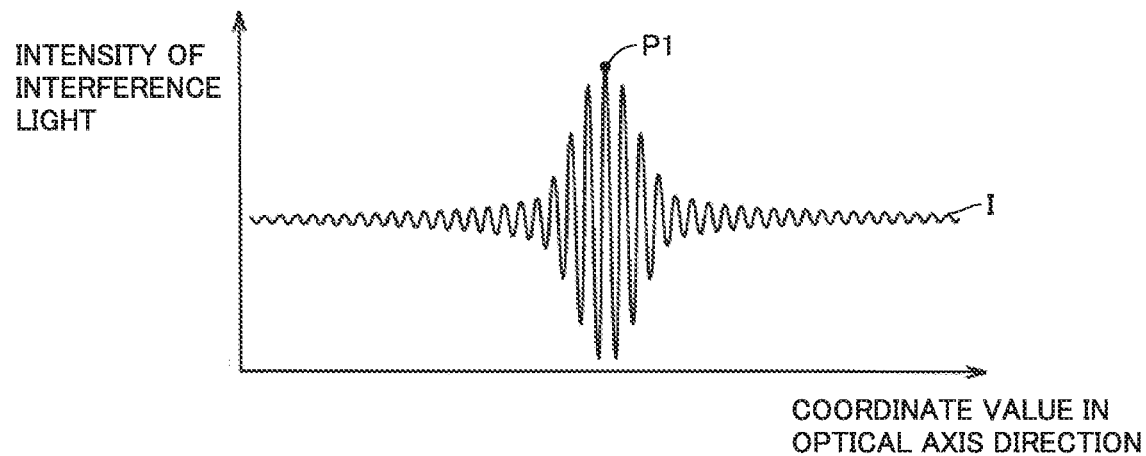
FIG. 5 is a diagram illustrating a change in intensity of interference light in the case of moving the two-beam interference objective lens illustrated in FIG. 1 in an optical axis direction.

FIG. 5 is a diagram illustrating a change in intensity of interference light in the case of moving two-beam interference objective lens 4 in the optical axis direction. The horizontal axis in FIG. 5 represents a coordinate in the optical axis direction (position of Z stage 7). The vertical axis in FIG. 5 represents the intensity of interference light in an image obtained on imaging plane 6A.

Two-beam interference objective lens 4 causes interference between light reflected from a surface of a target object and reference light to obtain interference light. As illustrated in FIG. 5, the intensity of the interference light oscillates around a certain value in a constant cycle in accordance with the position of Z stage 7, and the amplitude thereof corresponds to the contrast. P1 at which the amplitude is maximized corresponds to the focus position of lens 21. For example, when work 15 has a flat surface and work 15 is disposed perpendicularly to the optical axis of the objective lens, reflected light is regular reflected light and the contrast of the interference light is high. However, in a state where work 15 is inclined, light L1 returning to an aperture of objective lens 21 decreases and the intensity of the reflected light decreases. As a result, the contrast of the interference light also decreases.

The decrease in contrast of the interference light makes a clear contrast peak less likely to occur and makes detection of peak P1 difficult when a distance between the target object and the objective lens is changed. The height of a place where the peak cannot be detected is indefinite, and thus, it is difficult to accurately measure a shape of the target object.

However, a difference in amount of reflected light caused by surface roughness of work 15 can in some cases be recognized as a difference in brightness and darkness between pixels of an image obtained by imaging device 6.

Thus, in the embodiment, in addition to a luminance of a target pixel which is a target of calculation of the focus position, an evaluation value correlated with a difference between the luminance of the target pixel and luminances of a plurality of unit regions adjacent to the target pixel is used as an evaluation value required to obtain the focus position, and a variance value of the luminance of the target pixel and luminances of pixels included in an adjacent region adjacent to the target pixel is used as the evaluation value correlated with the difference, to thereby calculate the focus position of each pixel.

Figure 6:
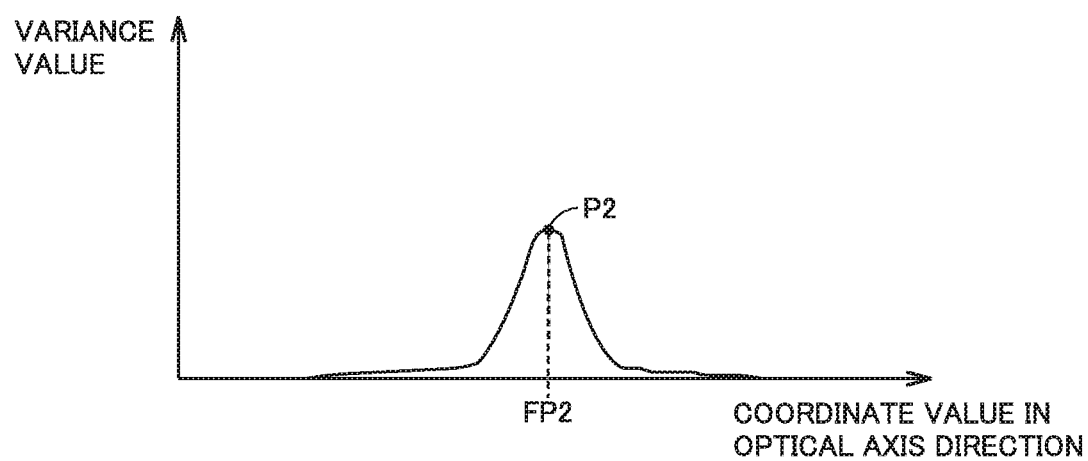
FIG. 6 is a diagram illustrating a change in variance value of the intensity of interference light in the case of moving the two-beam interference objective lens in the optical axis direction.

FIG. 6 is a diagram illustrating a change in variance value of the intensity of interference light in the case of moving two-beam interference objective lens 4 in the optical axis direction. The horizontal axis in FIG. 6 represents a coordinate in the optical axis direction (position of Z stage 7). The vertical axis in FIG. 6 represents the variance value of the intensity of the interference light. As illustrated in FIG. 6, a clear peak P2 of the variance value occurs when a distance between work 15 and two-beam interference objective lens 4 is changed. A position FP2 corresponding to peak P2 substantially coincides with the focus position. Therefore, use of the variance value makes it possible to calculate the focus position of the target pixel with a high degree of precision. As a result, the shape of work 15 can be accurately measured.

Figure 7:
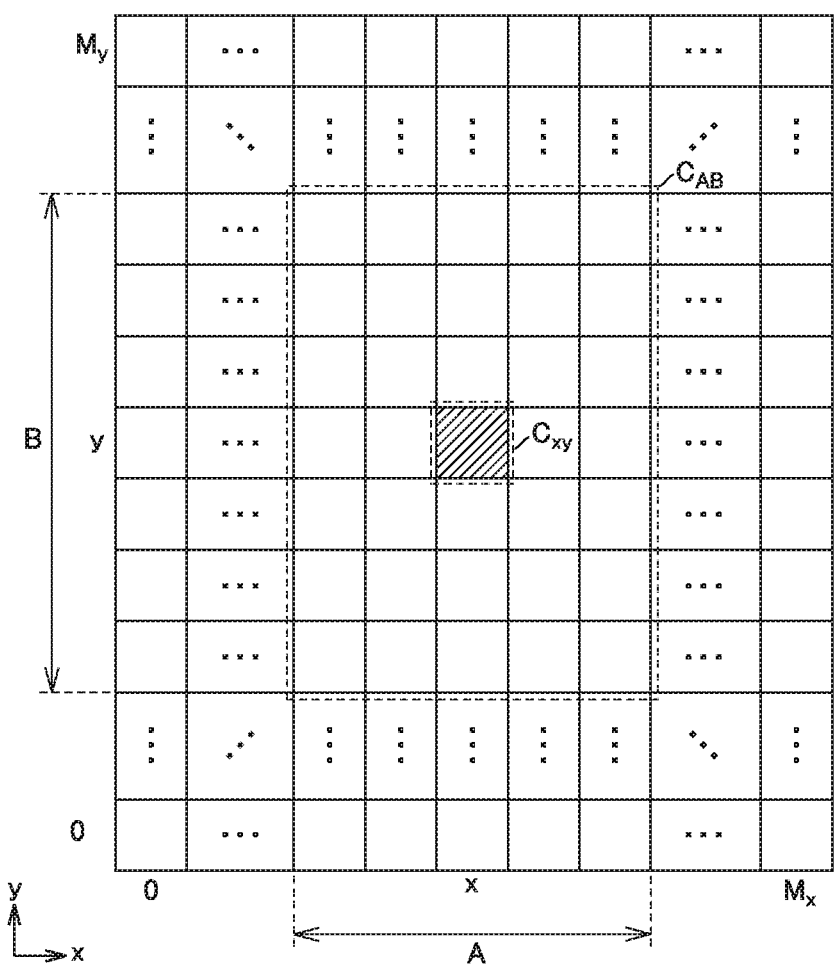
FIG. 7 is a diagram illustrating pixels adjacent to a target pixel.

FIG. 7 is a diagram schematically illustrating a plurality of pixels forming an image obtained by imaging device 6. Each pixel forming the image obtained by imaging device 6 is specified by a position (x, y). A coordinate value x of each pixel has any one of the values ranging from 0 to $M_x$. A coordinate value y of each pixel has any one of the values ranging from 0 to $M_y$. In the embodiment, a variance value V(x, y) of a pixel $C_{xy}$ located at the position (x, y) on the image is expressed by Equation (1) below, using luminances G(i, j) of the pixels included in an adjacent region $R_{AB}$ of A×B centered at pixel $C_{xy}$.

$$V(x,y) = \frac{\sum_{j=y-B/2}^{y+B/2} \sum_{i=x-A/2}^{x+A/2} \{G(i,j) - G_{ave}\}^2}{AB}. \quad (1)$$

In Equation (1), $G_{ave}$ represents an average value of the luminances in adjacent region $R_{AB}$ and is expressed by Equation (2) below:

$$G_{ave} = \frac{\sum_{j=y-B/2}^{y+B/2} \sum_{i=x-A/2}^{x+A/2} G(i,j)}{AB}. \quad (2)$$

In addition to the luminance-related variance value, a luminance-related primary differential value or secondary differential value used for edge detection of an image can be used as the evaluation value which is correlated with the difference between the luminance of the target pixel and the luminance of each of the plurality of pixels forming the adjacent region including the target pixel and shows a peak at the focus position. Examples of the luminance-related primary differential value can include a gradient D1a expressed by Equation (3) below:

$$D1a(x,y)=|G(x+1,y-1)-G(x-1,y-1)|+|G(x+1,y)-G(x-1,y)|+|G(x+1,y+1)-G(x-1,y+1)|+|G(x-1,y+1)-G(x-1,y-1)|+|G(x,y+1)-G(x,y-1)|+|G(x+1,y+1)-G(x+1,y-1)| \quad (3).$$

Gradient D a is a sum of an absolute value of a luminance gradient between pixels facing each other in the x axis direction of the coordinate axes defining the position of the pixels, of the pixels adjacent to the target pixel, and an absolute value of a luminance gradient between pixels facing each other in the y axis direction, of the pixels adjacent to the target pixel. The luminance gradient between the pixels corresponds to a difference in luminance between the pixels.

Figure 8:
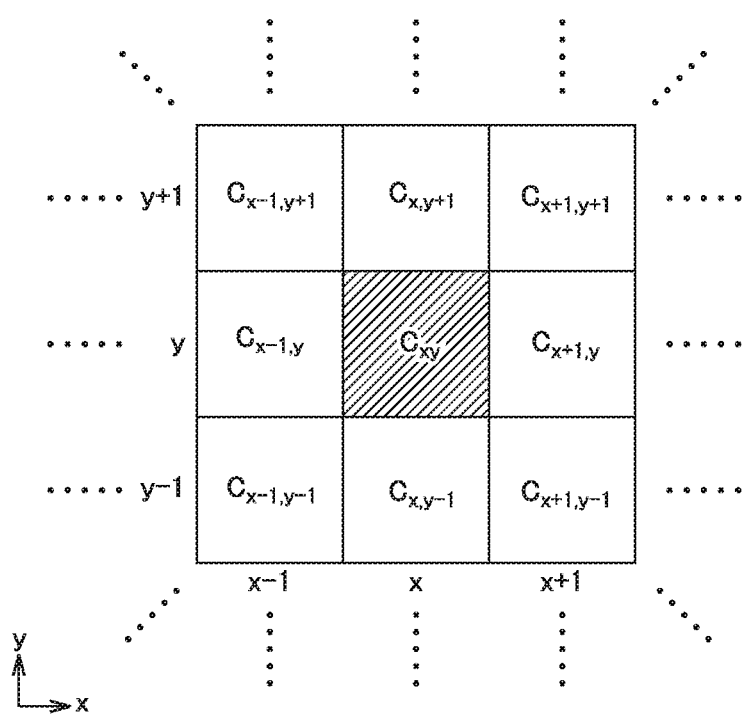
FIG. 8 is a diagram schematically illustrating pixels forming an image obtained by an imaging device.

FIG. 8 is a diagram illustrating the pixels adjacent to target pixel $C_{xy}$. As illustrated in FIG. 8, target pixel $C_{xy}$ is surrounded by pixels $C_{x-1, y}$, $C_{x, y-1}$, $C_{x+1, y+1}$, $C_{x+1, y}$, $C_{x+1, y-1}$, $C_{x, y-1}$, $C_{x-1, y-1}$, and $C_{x-1, y}$. Referring to FIG. 8 and Equation (3), gradient D1a is a sum of an absolute value (|G(x+1, y-1)-G(x-1, y-1)|) of a luminance gradient between pixels $C_{x+1, y-1}$ and $C_{x-1, y-1}$, facing each other in the x axis direction, an absolute value (|G(x+1, y)-G(x-1, y)|) of a luminance gradient between pixels $C_{x+1, y}$ and $C_{x-1, y}$, facing each other in the x axis direction, an absolute value (|G(x+1, y+1)-G(x-1, y+1)|) of a luminance gradient between pixels $C_{x+1, y+1}$ and $C_{x-1, y+1}$ facing each other in the x axis direction, an absolute value (|G(x-1, y+1)-G(x-1, y-1)|) of a luminance gradient between pixels $C_{x-1, y+1}$ and $C_{x-1, y-1}$ facing each other in the y axis direction, an absolute value (|G(x, y+1)-G(x, y-1)|) of a luminance gradient between pixels $C_{x, y+1}$ and $C_{x, y-1}$ facing each other in the y axis direction, and an absolute value (|G(x+1, y-1)-G(x+1, y-1)|) of a luminance gradient between pixels $C_{x+1, y+1}$ and $C_{x+1, y-1}$ facing each other in the y axis direction.

As the luminance-related primary differential value, a gradient D1b expressed by Equation (4) below can also be used:

$$D1b(x,y)=D1a(x,y)+|G(x+1,y+1)-G(x-1,y-1)|+|G(x+1,y-1)-G(x-1,y+1)| \quad (4).$$

Gradient D1b is obtained by adding, to gradient D1a, an absolute value of a luminance gradient between pixels facing each other in the diagonal line direction of the coordinate axes defining the position of the pixels, of the pixels adjacent to the target pixel.

Referring to FIG. 8 and Equation (4), gradient D1b is a sum of gradient D1a, an absolute value (|G(x+1, y+1)-G(x-1, y-1)|) of a luminance gradient between pixels $C_{x+1, y+1}$ and $C_{x-1, y-1}$ facing each other in the diagonal line direction and an absolute value (|G(x+1, y-1)-G(x-1, y+1)|) of a luminance gradient between pixels $C_{x+1, y-1}$ and $C_{x-1, y+1}$ facing each other in the diagonal line direction.

As the luminance-related secondary differential value, a Laplacian D2a expressed by Equation (5) below can be used:

$$D2a(x,y)=|\{(G(x,y)-G(x-1,y)\}-\{G(x+1,y)-G(x,y)\}|+|\{(G(x,y)-G(x,y-1)\}-\{G(x,y+1)-G(x,y)\}|=|2G(x,y)-G(x-1,y)-G(x+1,y)|+|2G(x,y)-G(x,y-1)-G(x,y+1)| \quad (5).$$

Laplacian D2a is a sum of a difference in luminance gradient between the target pixel and a pixel adjacent to the target pixel in the x axis direction of the coordinate axes defining the position of the pixels, and a difference in luminance gradient between the target pixel and a pixel adjacent to the target pixel in the y axis direction.

Referring to FIG. 8 and Equation (5), Laplacian D2a is a sum of an absolute value of a difference between a gradient (G(x, y)-G(x-1, y)) between target pixel $C_{xy}$ and pixel $C_{x-1, y}$ adjacent to target pixel $C_{xy}$ in the x axis direction and a gradient (G(x+1, y)-G(x, y)) between target pixel $C_{xy}$ and pixel $C_{x+1, y}$ adjacent to target pixel $C_{xy}$ in the x axis direction, and an absolute value of a difference between a gradient (G(x, y)-G(x, y-1)) between target pixel $C_{xy}$ and pixel $C_{x, y-1}$ adjacent to target pixel $C_{xy}$ in the y axis direction and a gradient (G(x, y+1)-G(x, y)) between target pixel $C_{xy}$ and pixel $C_{x, y+1}$ adjacent to target pixel $C_{xy}$ in the y axis direction.

As the luminance-related secondary differential value, a Laplacian D2b expressed by Equation (6) below can also be used:

$$D2b(x,y)=D2a(x,y)+|\{G(x,y)-G(x-1,y-1)\}-\{G(x+1,y+1)-G(x,y)\}|+|\{G(x,y)-G(x-1,y-1)\}-\{G(x+1,y-1)-G(x,y)\}|=D2a(x,y)+|2G(x,y)-G(x-1,y-1)-G(x+1,y+1)|+|2G(x,y)-G(x-1,y+1)-G(x+1,y-1)| \quad (6).$$

Laplacian D2b is obtained by adding, to Laplacian D2a, a difference in luminance gradient between the target pixel and a pixel adjacent to the target pixel in the diagonal line direction of the coordinate axes defining the position of the pixels.

Referring to FIG. 8 and Equation (6), Laplacian D2b is a sum of Laplacian D2a, an absolute value of a difference between a gradient (G(x, y)-G(x-1, y-1)) between target pixel $C_{xy}$ and pixel $C_{x-1, y-1}$ adjacent to target pixel $C_{xy}$ in the diagonal line direction and a gradient (G(x+1, y+1)−G(x, y)) between target pixel $C_{xy}$ and pixel $C_{x+1, y+1}$ adjacent to target pixel $C_{xy}$ in the diagonal line direction, and an absolute value of a difference between a gradient (G(x, y)−G(x−1, y+1)) between target pixel $C_{xy}$ and pixel $C_{x−1, y+1}$ adjacent to target pixel $C_{xy}$ in the diagonal line direction and a gradient (G(x+1, y−1)−G(x, y)) between target pixel $C_{xy}$ and pixel $C_{x+1, y−1}$ adjacent to target pixel $C_{xy}$ in the diagonal line direction.

[Shape Measuring Process]

Figure 9:
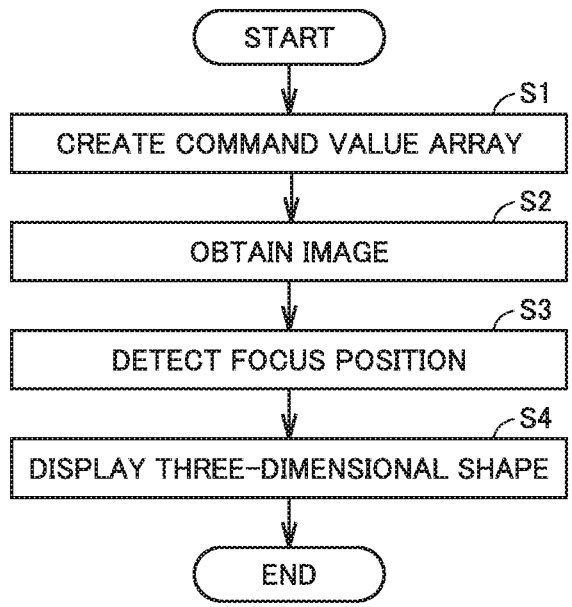
FIG. 9 is a flowchart illustrating the shape measuring process executed by a processing unit of the control device.

FIG. 9 is a flowchart illustrating the shape measuring process executed by processing unit 41 of control device 11. As illustrated in FIG. 9, in step S1 (hereinafter, the step will be simply denoted as S), processing unit 41 creates a position command value array and an illumination command value array, and moves the process to S2.

In S2, processing unit 41 sets a luminance of light source 2 at a luminance determined by the illumination command value array, to apply white light to work 15. Processing unit 41 also moves Z stage 7 to a position determined by each value of the position command value array, to obtain an image of interference light at each position. In addition, for each obtained image, processing unit 41 calculates an evaluation value of each pixel forming the image, and moves the process to S3.

In S3, processing unit 41 detects a position of Z stage 7 where the evaluation value of each pixel is maximized as a focus position of the pixel, and moves the process to S4.

Processing unit 41 causes monitor 14 to display a shape of work 15 based on the focus position of each pixel, and ends the process.

Each of S1 to S3 will be described in detail below.

In S1, processing unit 41 creates the position command value array and the illumination command value array, and stores the position command value array and the illumination command value array in data storage unit 43. In the embodiment, the illumination command value array is a constant value. A method for creating the position command value array will be described below.

EZ[i] which is the i-th value of the position command value array is expressed by Equation (7) below, using a coordinate value Z[i] of Z stage 7 corresponding to EZ[i], a maximum height $Z_{max}$ of Z stage 7, a minimum height $Z_{min}$ of Z stage 7, a control voltage $EZ_{max}$ corresponding to maximum height $Z_{max}$, and a control voltage $EZ_{min}$ corresponding to minimum height $Z_{min}$:

$$EZ[i]=Z[i](EZ_{max}-EZ_{min})/(Z_{max}-Z_{min}) \quad (7).$$

Z stage 7 moves at a constant speed W (μm/sec) and never stops during image obtainment. Assuming that reference is sequentially made to the position command value array from the top at constant time intervals ΔT1 (sec), coordinate value Z[i] is expressed by Equation (8) below:

$$Z[i]=i\times\Delta T1\times W \quad (8).$$

When Equation (8) is substituted into Equation (7), position command value EZ[i] is expressed by Equation (9) below:

$$EZ[i]=(i\times\Delta T1\times W)(EZ_{max}-EZ_{min})/(Z_{max}-Z_{min}) \quad (9).$$

In the embodiment, $EZ_{max}=10$ (V), $EZ_{min}=0$ (V), $Z_{max}=100$ (μm), and $Z_{min}=0$ (μm). The i-th position command value EZ[i] is expressed by Equation (10) below:

$$EZ[i]=(i\times\Delta T1\times W)/10 \quad (10).$$

The number N of elements in the array is N=D/(ΔT1×W), where D (μm) represents a movement distance of Z stage 7.

Figure 10:
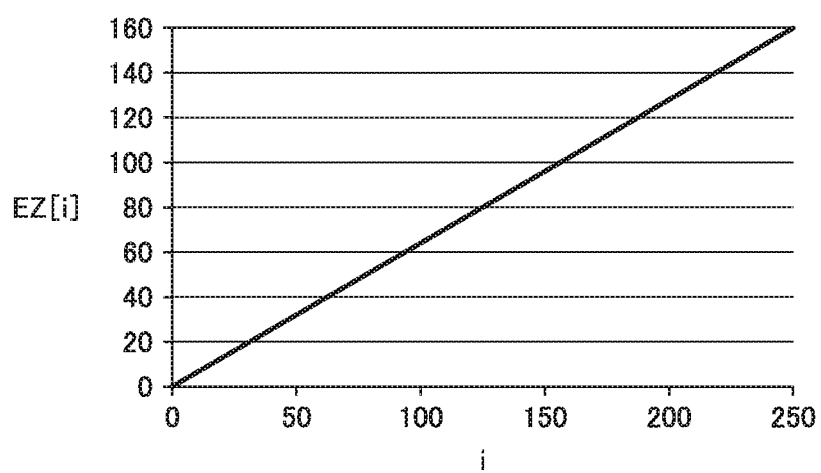
FIG. 10 is a graph illustrating the relation between a position command value array and the array number indicating the order of the array.

FIG. 10 is a graph illustrating the relation between the position command value array and the array number i indicating the order of the array. The horizontal axis in FIG. 10 represents array number i, and the vertical axis in FIG. 10 represents position command value EZ[i]. As illustrated in FIG. 10, position command value EZ[i] increases in proportion to array number i.

Referring again to FIG. 9, S2 will be described. In S2, control device 11 obtains the image of interference light while controlling the position of Z stage 7 and the brightness of light source 2 based on the position command value array and the illumination command value array created in S1.

In response to a start trigger from processing unit 41, position control value output unit 44 and illumination control value output unit 45 start to output control voltages EZ and EL, respectively. Position control value output unit 44 sequentially refers to the position command value array from the top and changes control voltage EZ at constant time intervals ΔT1 (see). When the last number of the position command value array is reached, position control value output unit 44 ends output of control voltage EZ.

In response to a start trigger from processing unit 41, image input unit 42 starts to capture an image from imaging device 6. Image input unit 42 captures an image output from imaging device 6 in a constant cycle ΔT2. Image input unit 42 transfers the captured image to data storage unit 43, using a DMA (Direct Memory Access) transfer method. The DMA transfer is completed in a shorter time than cycle ΔT2.

In the following description, (x, y) represents a position of a pixel on an image obtained by imaging device 6. G[k](x, y) represents a luminance of a pixel at the position (x, y) of a k-th obtained image, of a plurality of images obtained by imaging device 6. $G_{max}(x, y)$ represents a maximum value of the luminance of the pixel at the position (x, y) in the plurality of captured images. $IDG_{max}(x, y)$ represents the image number at which the luminance of the pixel at the position (x, y) is maximized.

V[k](x, y) represents a variance value of the pixel at the position (x, y) of the k-th obtained image, of the plurality of images obtained by imaging device 6. $V_{max}(x, y)$ represents a maximum value of the variance value of the pixel at the position (x, y) in the plurality of images obtained by imaging device 6. $IDV_{max}(x, y)$ represents the image number at which the variance value at the position (x, y) is maximized.

Processing unit 41 causes the k-th image obtained by imaging device 6 to undergo the process, while changing image number k. Processing unit 41 calculates variance value V[k](x, y) for each pixel forming the k-th obtained image, while changing x and y. Processing unit 41 calculates maximum luminance $G_{max}(x, y)$, maximum variance value $V_{max}(x, y)$, maximum luminance number $IDG_{max}(x, y)$, and maximum variance value number $IDV_{max}(x, y)$ for each pixel on the image obtained by imaging device 6. The process of deriving each value will be described in detail below.

Figure 11:
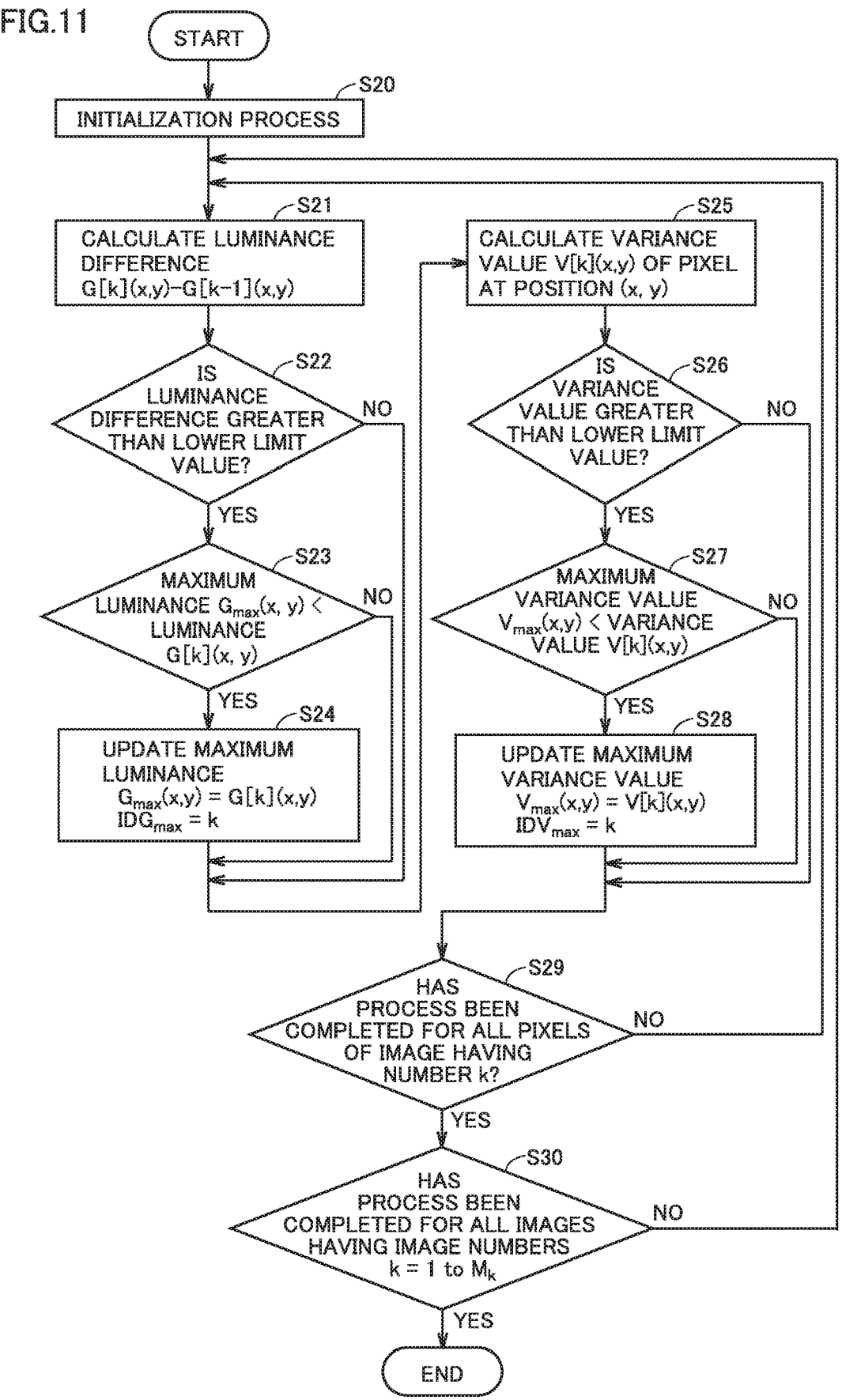
FIG. 11 is a flowchart for describing the process of calculating a luminance and a variance value of each pixel of each image by the processing unit.

FIG. 11 is a flowchart for describing the process of calculating the variance value, the maximum luminance, the maximum variance value, the maximum luminance number, and the maximum variance value number of each image by processing unit 41. As illustrated in FIG. 11, in S20, processing unit 41 executes the initialization process. Processing unit 41 initializes maximum luminance $G_{max}(x, y)$ and maximum variance value $V_{max}(x, y)$ to zero in the initialization process. Processing unit 41 initializes maximum luminance number $IDG_{max}(x, y)$ and maximum variance value number $IDV_{max}(x, y)$ to −1. This initialization process is executed, for example, immediately before processing unit 41 issues the start trigger.

Processing unit 41 performs steps S21 to S28 while changing x from 0 to $M_x$ and changing y from 0 to $M_y$ for the k-th image obtained by imaging device 6.

In S21, processing unit 41 calculates a luminance difference G[k](x, y)−G[k−1](x, y) for the pixel at the position (x, y), and moves the process to S22. In S22, processing unit 41 determines whether or not the luminance difference is not less than a lower limit value TG (whether or not Equation (11) below is satisfied). Herein, by regarding the luminance difference as the amplitude of interference light in FIG. 5 and making a comparison with lower limit value TG, a small-amplitude image having image number k is excluded from the detection target.

$$TG \leq G[k](x,y) - G[k-1](x,y) \quad (11)$$

When Equation (11) is satisfied (YES in S22), processing unit 41 moves the process to S23 and compares luminance G[k](x, y) with maximum luminance $G_{max}$(x, y). When luminance G[k](x, y) is greater than maximum luminance $G_{max}$(x, y) (YES in S23), processing unit 41 moves the process to S24. In S24, processing unit 41 updates maximum luminance $G_{max}$(x, y) to luminance G[k](x, y) and updates maximum luminance number $IDG_{max}$(x, y) to image number k, and moves the process to S25.

When Equation (11) is not satisfied (NO in S22) or when luminance G[k](x, y) is not more than maximum luminance $G_{max}$(x, y) (NO in S23), processing unit 41 moves the process to S25.

In S25, processing unit 41 calculates variance value V[k](x, y) for the pixel at the position (x, y), using Equation (1), and moves the process to S26. In S26, processing unit 41 determines whether or not variance value V[k](x, y) is not less than a lower limit value TV. When variance value V[k](x, y) is not less than lower limit value TV (YES in S26), processing unit 41 moves the process to S27 and compares variance value V(x, y) with maximum variance value $V_{max}$(x, y). When variance value V[k](x, y) is greater than maximum variance value $V_{max}$(x, y) (YES in S27), processing unit 41 updates maximum variance value $V_{max}$(x, y) to variance value V[k](x, y) and updates maximum variance value number $IDV_{max}$(x, y) to image number k.

When variance value V[k](x, y) is less than lower limit value TV (NO in S26) or when variance value V[k](x, y) is not more than maximum variance value $V_{max}$(x, y) (NO in S27), processing unit 41 moves the process to S29.

In S29, processing unit 41 determines whether or not the process has been completed for all pixels included in the image having number k. When the process has not been completed for all pixels included in the image having number k (NO in S29), processing unit 41 updates the position (x, y) of the pixel to a position of a next pixel and returns the process to S21. When the process has been completed for all pixels included in the image having number k (YES in S29), processing unit 41 moves the process to S30.

In S30, processing unit 41 determines whether or not the process has been completed for all images obtained by imaging device 6. When the process has not been completed for all images (NO in S30), processing unit 41 updates image number k to the next image number and returns the process to S21. When the process has been completed for all images (YES in S30), the process is ended.

When S2 is ended, the maximum value of the luminance of the pixel at the position (x, y) is stored in maximum luminance $G_{max}$(x, y), for the plurality of images having the image numbers 0 to $k_{max}$ that are obtained by imaging device 6. Image number k at which luminance G[k](x, y) of the pixel at the position (x, y) is maximized is stored in maximum luminance number $IDG_{max}$(x, y). The maximum value of variance value V[k](x, y) of the luminance at the position (x, y) is stored in maximum variance value $V_{max}$(x, y). Image number k at which variance value V[k](x, y) of the luminance at the position (x, y) is maximized is stored in maximum variance value number $IDV_{max}$(x, y).

In S3, processing unit 41 detects the focus position of each pixel based on maximum luminance number $IDG_{max}$(x, y) and maximum variance value number $IDV_{max}$(x, y) obtained in S2.

Figure 12:
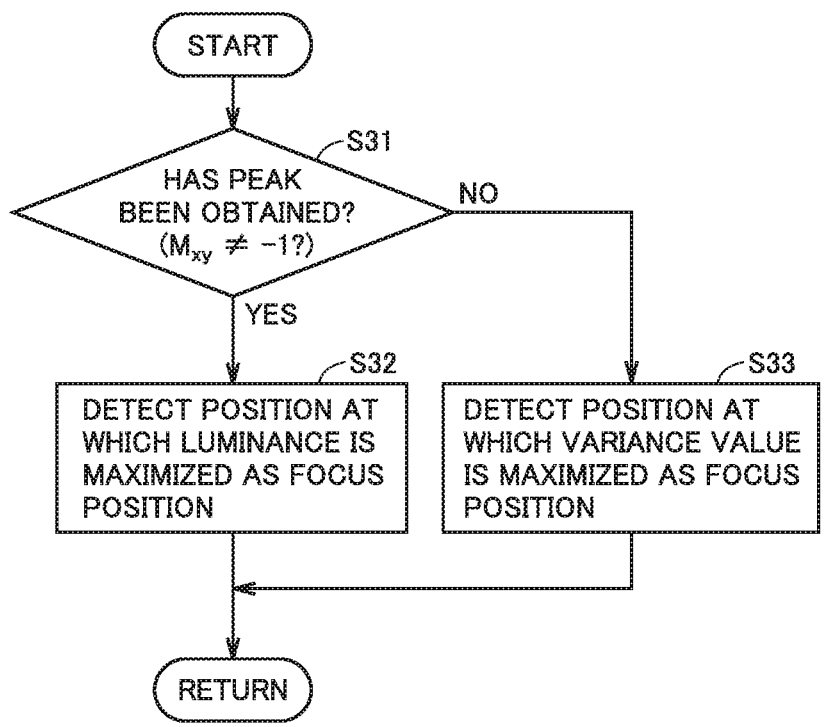
FIG. 12 is a flowchart specifically illustrating the process of detecting a focus position.

FIG. 12 is a flowchart more specifically illustrating the process of detecting the focus position (S3 in FIG. 9). For the sake of simplicity of description, maximum luminance number $IDG_{max}$(x, y) will be denoted as maximum luminance number $M_{xy}$ hereinafter.

As illustrated in FIG. 12, in S31, processing unit 41 determines whether or not maximum luminance number $M_{xy}$ has been updated to a value other than −1. When maximum luminance number $M_{xy}$ has been updated to the value other than −1 (YES in S31), processing unit 41 moves the process to S32 and detects the focus position based on the position of Z stage 7 at which the luminance of interference light is maximized. When maximum luminance number $M_{xy}$ has not been updated to the value other than −1 (NO in S31), processing unit 41 moves the process to S33 and detects the focus position based on the position of Z stage 7 at which the variance value of the luminance of interference light is maximized. The details of S32 and S33 will be described below.

S32 is performed when maximum luminance number $M_{xy}$ has been updated to the value other than −1 (YES in S31). The fact that maximum luminance number $M_{xy}$ is the value other than −1 means that Equation (11) about the luminance of the pixel at the position (x, y) has once been satisfied in S2. In such a case, on the assumption that a clear peak has been obtained for the luminance of the pixel at the position (x, y), the focus position is detected based on the luminance of interference light. Specifically, with respect to each of the ($M_{xy}$−L)-th image to the ($M_{xy}$+L)-th image, an envelope value M[k](x, y) expressed by Equation (12) below is calculated for each pixel (x, y) on the image having image number k. Integer L is a positive integer and is, for example, 5.

$$M[k](x, y) = \frac{\sqrt{\begin{array}{c}(G[k-1](x, y) - G[k+1](x, y))^2 - \\ (G[k-2](x, y) - G[k](x, y)) \\ (G[k](x, y) - G[k+2](x, y))\end{array}}}{(2)} \quad (12)$$

Figure 13:
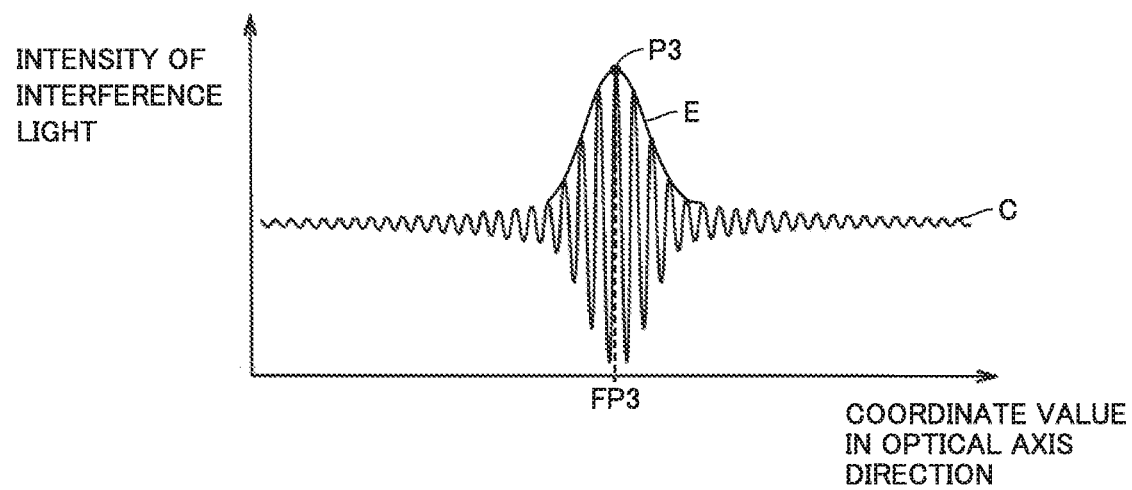
FIG. 13 is a diagram illustrating a curve indicating the relation between a coordinate value in the optical axis direction of a Z stage and the intensity of interference light, and an envelope of the curve.

FIG. 13 is a diagram illustrating a curve C indicating the relation between coordinate value Z in the optical axis direction of Z stage 7 and the intensity of interference light, and a curve E of curve C. The relation between coordinate value Z in the optical axis direction of Z stage 7 corresponding to image number k and envelope value M[k](x, y) is expressed as curve E in FIG. 13.

Using envelope value M[k](x, y) calculated by Equation (12), a focus position f(x, y) of each pixel is calculated in accordance with Equation (13) below:

$$f(x, y) = \frac{\sum_{k=M_{xy}-L}^{M_{xy}+L} M[k](x, y) \times k}{\sum_{k=M_{xy}-L}^{M_{xy}+L} M[k](x, y)}. \quad (13)$$

Equation (13) is a formula for obtaining the centroid of curve E illustrated in FIG. 13. When envelope value M[k](x, y) is data symmetric about a vertex of curve E as illustrated in FIG. 13, the centroid shows a peak P3 which is the center position thereof. Focus position f(x, y) is a position FP3 corresponding to peak P3 in FIG. 13.

Referring again to FIG. 12, S33 is performed when maximum luminance number $M_{xy}$ remains at −1 which is an initial value (NO in S31). The fact that maximum luminance number $M_{xy}$ remains at the initial value means that Equation (11) about the luminance of the pixel at the position (x, y) has never been satisfied in S2. In such a case, on the assumption that a peak has not been obtained for the luminance of the pixel at the position (x, y), the focus position is detected using the variance value calculated by Equation (1) in the embodiment. Specifically, with respect to each of the ($M_{xy}$−L)-th image to the ($M_{xy}$+L)-th image, focus position f(x, y) of each pixel is calculated in accordance with Equation (14) below, using variance value V[k](x, y) of the pixel at the position (x, y) on the image based on Equation (1):

$$f(x, y) = \frac{\sum_{j=M_{xy}-L}^{M_{xy}+L} V[j](x, y) \times j}{\sum_{j=M_{xy}-L}^{M_{xy}+L} V[j](x, y)}. \quad (14)$$

Using cycle ΔT2 in which the image is obtained by imaging device 6 and speed W (μm/sec) of Z stage 7, a focus position array F(x, y) at focus position f(x, y) is expressed by Equation (15) below:

$$F(x,y) = \Delta T2 \times W \times f(x,y) \quad (15).$$

Control device 11 causes monitor 14 to display focus position array F(x, y) expressed by Equation (15) in a three-dimensional manner, and thus, a three-dimensional shape of work 15 can be displayed.

According to the embodiment, in addition to a luminance of a target pixel which is a target of calculation of the focus position, an evaluation value correlated with a difference between the luminance of the target pixel and luminances of a plurality of unit regions adjacent to the target pixel is used as an evaluation value required to obtain the focus position, and a variance value of the luminance of the target pixel and luminances of pixels included in an adjacent region adjacent to the target pixel is used as the evaluation value correlated with the difference. Therefore, the focus position of each of the plurality of pixels included in the image can be calculated with a high degree of precision. As a result, the shape of work 15 can be accurately measured.

Figure 14:
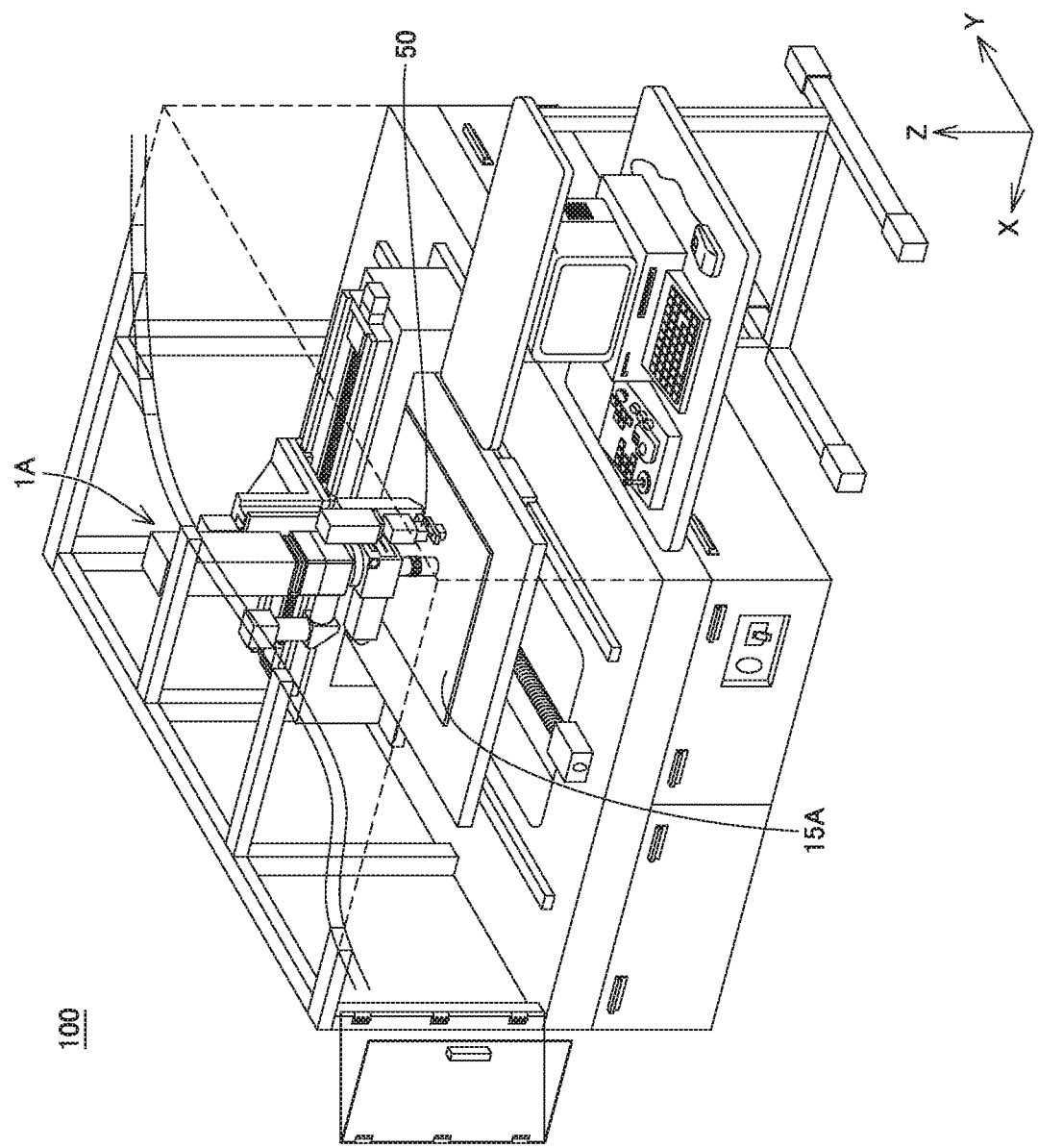
FIG. 14 is a schematic perspective view of a coating apparatus including the shape measuring apparatus according to the embodiment of the present invention.

FIG. 14 is a schematic perspective view of a coating apparatus 100 including the shape measuring apparatus according to the embodiment of the present invention. As illustrated in FIG. 14, coating apparatus 100 includes a shape measuring apparatus 1A and a coating mechanism 50. Shape measuring apparatus 1A measures a shape of a substrate 15A which is a target object to be coated. Using a coating needle provided in coating mechanism 50, coating mechanism 50 applies a coating material onto a surface of substrate 15A to be coated (upper surface side) and draws a circuit pattern on substrate 15A.

Figure 15:
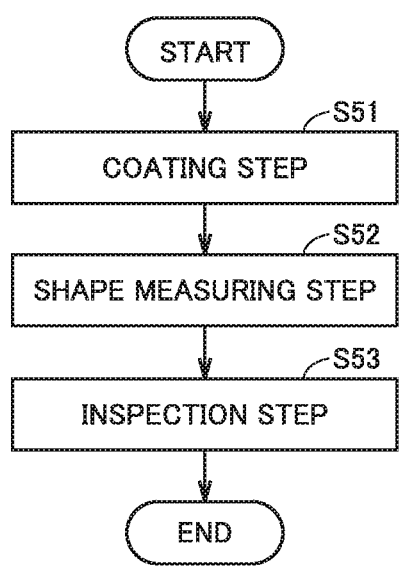
FIG. 15 is a flowchart illustrating the process of manufacturing a substrate executed in the coating apparatus in FIG. 14.

FIG. 15 is a flowchart illustrating the process of manufacturing substrate 15A. In S51, the coating step is performed. In the coating step, a circuit pattern is drawn on a surface of substrate 15A to be coated. Subsequently to S51, the shape measuring step is performed in S52. In the shape measuring step, a shape of the surface of substrate 15A to be coated is measured using shape measuring apparatus 1A. Subsequently to S52, the inspection step is performed in S53. In the inspection step, the shape of the surface to be coated on which the circuit pattern was drawn in S51 is inspected. When S53 is ended, the process of manufacturing substrate 15A is completed.

It should be understood that the embodiment disclosed herein is illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1, 1A shape measuring apparatus; 2 light source; 3 light source controller, 4 two-beam interference objective lens; 5 observation optical system; 6 imaging device; 6A imaging plane; 7 Z stage; 8 Z stage controller; 9 support member; 10 base plate; 11 control device; 12 keyboard; 13 mouse; 14 monitor; 15 work; 15A substrate; 21 lens; 22 reference mirror; 23 beam splitter; 31 condenser lens; 32 half mirror; 33 image lens; 34 filter; 41 processing unit; 42 image input unit; 43 data storage unit; 44 position control value output unit; 45 illumination control value output unit; 50 coating mechanism; 100 coating apparatus; $C_{xy}$ pixel; D1a, D1b gradient, D2a, D2b Laplacian; E curve; EL, EZ control voltage; L1, L2 light; $R_{AB}$ adjacent region.

The invention claimed is:

1. A shape measuring apparatus configured to measure a shape of a target object by applying white light to the target object and using reflected light from the target object, the shape measuring apparatus comprising:

a light source configured to output the white light;

a two-beam interference objective lens configured to divide the white light into two light beams, apply one of the two light beams to the target object and the other light beam to a reference surface, and cause interference between the reflected light from the target object and reflected light from the reference surface to output interference light;

an imaging plane configured to obtain an image of the interference light output from the two-beam interference objective lens;

an observation optical system comprising at least one optical element configured to redirect and guide the white light output from the light source to a surface of the target object through the two-beam interference objective lens and to guide the reflected light from the surface to the imaging plane after the reflected light has passed through the two-beam interference objective lens;

a Z stage configured to move the two-beam interference objective lens relative to the target object; and a control computer configured to operate an imaging device comprising the imaging plane to obtain a plurality of images while operating the Z stage to change a distance between the target object and the two-beam interference objective lens in an optical axis direction of the two-beam interference objective lens, and configured to measure the shape of the target object using the plurality of images, the control device computer being further configured to
for each unit region in the plurality of images, calculate, as a focus position of the unit region, a position of the two-beam interference objective lens at which a luminance-based evaluation value is maximized over the plurality of images, and measure the shape of the target object based on the focus position of each unit region in the plurality of images, use, as the evaluation value, a luminance of each unit region in the plurality of images as well as a value correlated with a difference between the luminance of the unit region and luminances of a plurality of unit regions adjacent to the unit region, use the luminance as the evaluation value when a maximum value of the luminance of each unit region in the plurality of images is greater than a threshold value, and use the value correlated with the difference as the evaluation value when the maximum value is smaller than the threshold value.

2. The shape measuring apparatus according to claim 1, wherein
the evaluation value is a variance value of the luminance of each unit region in the plurality of images and the luminances of the plurality of unit regions adjacent to the unit region.

3. The shape measuring apparatus according to claim 1, wherein
the evaluation value is a sum of absolute values of luminance gradients between unit regions adjacent to each unit region in the plurality of images.

4. The shape measuring apparatus according to claim 1, wherein
the evaluation value is a sum of absolute values of differences in luminance gradient between each unit region in the plurality of images and the plurality of unit regions adjacent to the unit region.

5. A method for manufacturing a target object to be coated, the method comprising measuring a shape of the target object to be coated by:

generating white light from a light source;
dividing, with a two-beam interference objective lens, the white light into two light beams;
applying one of the two light beams to the target object by guiding the one of the two light beams of white light output from the light source to a surface of the target object through the two-beam interference objective lens;
applying the other light beam to a reference surface;
causing interference between reflected light from the target object and reflected light from the reference surface to output interference light from the two-beam interference objective lens;
guiding the interference light output from the two-beam interference objective lens to an imaging device;
moving the two-beam interference objective lens relative to the target object to change a distance between the target object and the two-beam interference objective lens in an optical axis direction of the two-beam interference objective lens;
obtaining a plurality of images of the interference light while changing the distance between the target object and the two-beam interference objective lens in the optical axis direction of the two-beam interference objective lens;
calculating, for each unit region in the plurality of images, as a focus position of the unit region, a position of the two-beam interference objective lens at which a luminance-based evaluation value is maximized over the plurality of images, wherein calculating the focus position of each unit region includes using, as the evaluation value, a luminance of each unit region in the plurality of images as well as a value correlated with a difference between the luminance of the unit region and luminances of a plurality of unit regions adjacent to the unit region;
measuring the shape of the target object based on the focus position of each unit region in the plurality of images;
utilizing the luminance as the evaluation value when a maximum value of the luminance of each unit region in the plurality of images is greater than a threshold value; and
utilizing the value correlated with the difference as the evaluation value when the maximum value is smaller than the threshold value.

* * * * *

UNITED STATES PATENT AND TRADEMARK OFFICE
CERTIFICATE OF CORRECTION

PATENT NO.       : 10,704,898 B2
APPLICATION NO.  : 16/076311
DATED            : July 7, 2020
INVENTOR(S)      : Hiroaki Ohba Page 1 of 1

It is certified that error appears in the above-identified patent and that said Letters Patent is hereby corrected as shown below:

In the Claims

At Column 15, Claim number 1, Line number 7, please delete "device"

Signed and Sealed this
Seventeenth Day of November, 2020

Andrei Iancu
*Director of the United States Patent and Trademark Office*